United States Patent [19]

Humkey et al.

[11] 3,958,585

[45] May 25, 1976

[54] APPARATUS FOR STRIPPING RESIDUAL SOLVENT FROM POLYMER PELLETS

[75] Inventors: Robert Garnett Humkey, Wilmington, Del.; Donald James Ryan, Port Neches, Tex.

[73] Assignee: E. I. Du Pont de Nemours and Company, Wilmington, Del.

[22] Filed: May 16, 1975

[21] Appl. No.: 578,138

Related U.S. Application Data

[62] Division of Ser. No. 433,378, Jan. 14, 1974, Pat. No. 3,920,624.

[52] U.S. Cl. .............................. 134/61; 134/25 R; 134/110
[51] Int. Cl.² .......................................... B08B 3/04
[58] Field of Search ............. 134/25 R, 61, 109, 110

[56] References Cited

UNITED STATES PATENTS

| | | | |
|---|---|---|---|
| 2,190,072 | 2/1940 | Keys | 134/110 X |
| 2,278,701 | 4/1942 | Karr | 134/61 |
| 2,862,511 | 12/1958 | Forsberg | 134/25 R X |
| 3,081,009 | 3/1963 | Cooper | 222/459 |
| 3,200,067 | 8/1965 | Levendusky | 134/25 R X |
| 3,664,354 | 5/1972 | Minbiole, Jr. et al. | 134/61 |
| 3,688,781 | 9/1972 | Talley, Jr. | 134/110 X |

*Primary Examiner*—Robert L. Bleutge

[57] ABSTRACT

Apparatus for continuous stripping of residual volatiles from polymer pellets, having their surfaces wet with water, by the use of an upwardly moving flow of steam through a downwardly moving column of wetted polymer pellets, moving in plug-flow, which minimizes back-mixing. The apparatus operates with substantially less energy requirements than those of the prior art, and air pollution is eliminated since the apparatus recovers the volatiles by condensing the steam containing the stripped volatiles and recovering them. In the preferred case, back-mixing of the pellets at the bottom of the column is minimized by feeding the pellets to the top of the column over a deflector having a circular base approximately one-half the diameter of the column and by further deflecting the pellets at the base of the column from the center axis toward the wall of the inverted conical base of the column.

2 Claims, 5 Drawing Figures

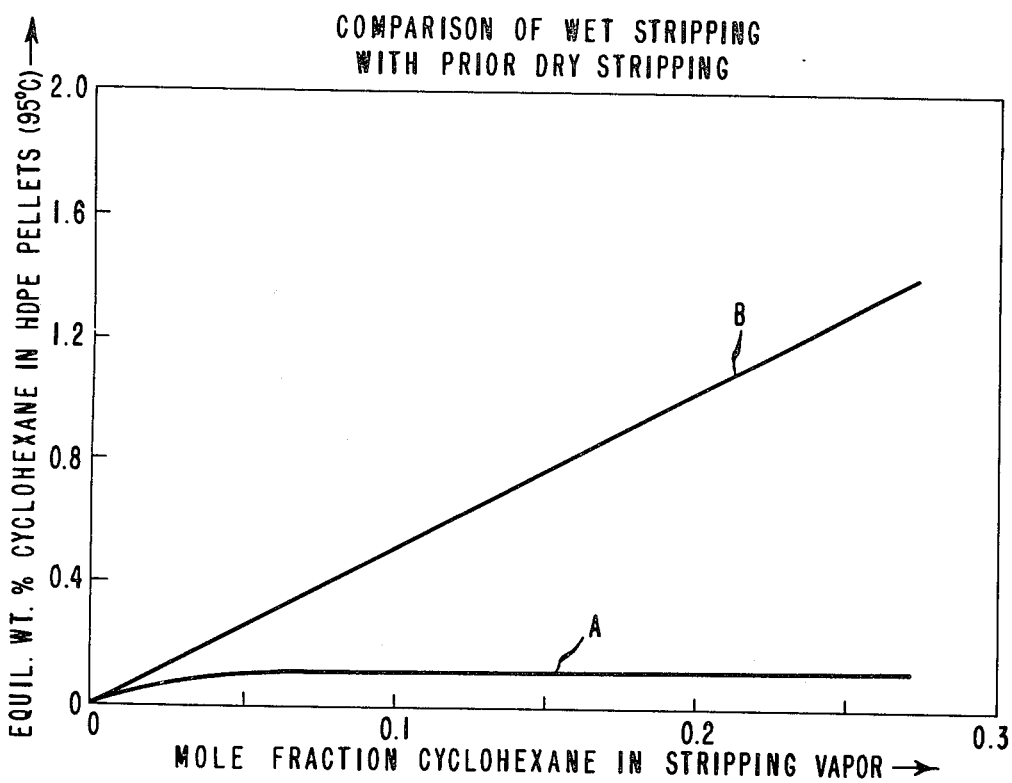
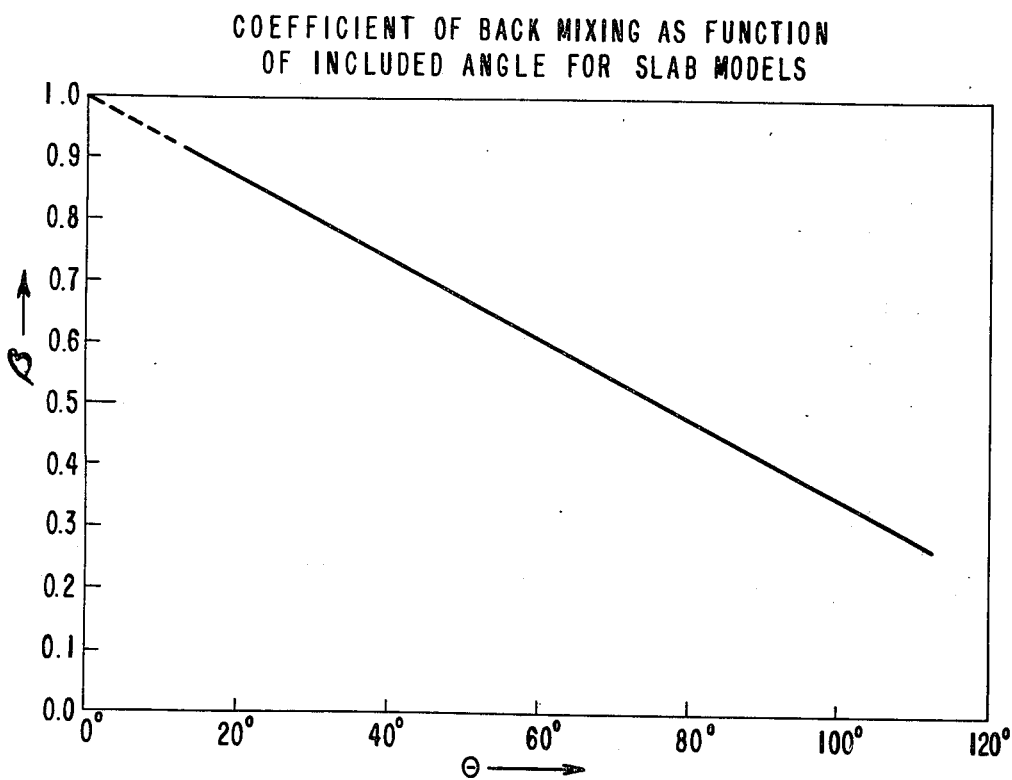

BACKMIXING IN CONICAL BASE OF COLUMN WITH DISTRIBUTORS

BACKMIXING IN CONICAL BASE OF OPEN COLUMN

APPARATUS FOR STRIPPING RESIDUAL SOLVENT FROM POLYMER PELLETS

This is a division of application Ser. No. 433,378, filed Jan. 14, 1974, now U.S. Pat. No. 3,920,624.

BACKGROUND OF THE INVENTION

1. Field of the Invention

The apparatus is a cylindrical tower with an inverted conical base; at the top of the column a deflector is placed to direct the incoming pellets onto the column so as to provide a surface with a toroidal contour; in the inverted conical base of the column a second deflector, in the form of two cones fastened together at their bases, is positioned on the central axis over the exit at the bottom apex of the cone so as to minimize or eliminate back-mixing of pellets as they flow through the base to the exit.

2. Prior Art

In polymerizations conducted in the presence of a solvent where solid polymer is produced, usually the resulting polymer, even after extrusion and/or cutting into pellets, retains some residual solvent, monomer and/or other residual volatiles which must be removed.

The removal of solvent or other residual volatiles from polymer pellets has been accomplished batchwise by passing hot gas and/or steam through a stationary bed of dry pellets, with or without agitation by tumbling, recirculation or stirring. However, it has previously not been possible to remove in a continuous process residual volatiles from particulate solids without contamination or mixing due to lack of control of pellet residence time during said removal. The relatively large volume of stripping medium and the low and variable residual solvent concentration in the pellets and vapor have heretofore made stripping and volatiles recovery inefficient and expensive.

Examples of the prior practice, which generally have been essentially batch operations employing either pellets having dry surfaces or suspensions of pellets in liquid, are found in Canadian Patent No. 836,977 of R. E. U. Routley, issued Mar. 16, 1970, U.S. Pat. No. 3,227,703 of P. S. Copenhaver, Jr. and R. L. Etter, Jr., issued Jan. 4, 1966, and U.S. Pat. No. 3,539,539 of J. Goetzke, issued Nov. 10, 1970. An apparatus designed as a bulking and mixing apparatus which shows some similarities to, but also critical differences from, the novel apparatus of the present invention is shown in British Patent Specification 846,198 of A. A. Karim, published Aug. 31, 1960. Apparatus for a solids flow system having an internal deflector is shown by U.S. Pat. No. 3,081,009 of F. D. Cooper issued Mar. 12, 1963. However, the function and location of the deflectors shown make them incapable of performing the function of the deflector of the apparatus of this invention of minimizing back-mixing in the reducing section.

The apparatus of this invention overcomes these problems. It also avoids the economic loss and air pollution caused by the venting to the atmosphere of residual volatiles, and it requires substantially less energy to operate, thus providing substantial savings in energy with resultant economy of operation.

DRAWINGS

FIG. I is a schematic drawing of the stripping apparatus of this invention which may be used in the wetstripping process of this invention. It is described in more detail hereafter.

FIG. II is a graph which shows the comparison at 95°C. of the equilibria of the wet-stripping process of this invention (Curve A) with dry stripping (Curve B), customarily used in the prior art, when applied to pellets of high-density polyethylene containing residual cyclohexane solvent. The equilibrium weight percent cyclohexane left in HDPE pellets (at 95°C. temperature) is plotted on the vertical ordinate while the mole fraction of cyclohexane in the stripping vapor is plotted on the horizontal abscissa.

FIG. III is a graph which shows the relation for HDPE between a coefficient of back-mixing, $\beta$, plotted on the vertical ordinate with $\theta$, the included angle of the trapezoidal base of a rectangular slab-model of stripping column filled with downwardly moving pellets, plotted on the horizontal abscissa. $\beta$ is defined as the ratio, $V_S/V_{CL}$, where $V_S$ is the vertical component of velocity of pellets next to the wall surface of a slab or rectangular model having an inverted trapezoidal base and $V_{CL}$ is the vertical velocity of pellets at the center-axis in the reducing section.

FIG. IV-A is a graph which shows the relationship between back-mixing of downwardly moving pellets in the inverted conical bottom of an open column (plotted in M lb. of HDPE pellets back-mixed in a 12-foot diameter vessel on the vertical ordinate versus $\theta$, the included angle of the conical base of the column, plotted on the horizontal abscissa). Curve C is for the case where the angle of repose, $\alpha$, of the pellets at the top of he column is 35° while curve D is for the case where $\alpha$ is 45°. The open column with conical base and pellets filling the column with conical pile configuration at top of column is shown by the diagrammatic sketch, 23, on the graph; on this sketch, $\alpha$, the angle of repose of the pellets at the top, and $\theta$, the included angle of the conical base of column, are shown.

FIG. IV-B is a graph which shows the relationship between back-mixing of pellets in the inverted conical bottom of the apparatus of this invention (FIG. I) when practicing the process with polyethylene pellets (plotted in M lb. of HDPE pellets back-mixed in a 12-foot diameter vessel on the vertical ordinate versus $\theta$, the included angle of the conical base of the column, plotted on the horizontal abscissa). Curve E is for the case where the angle of repose, $\alpha$, of the pellets at the top of the column is 35° while curve F is for the case where $\alpha$ is 45°. The novel stripping column, employed for this case, containing pellet distributors, 3 and 4, at the top and bottom of the column, with the top surface of the pellet bed having a toroidal contour, is shown on the graph by the diagrammatic sketch 24; on this sketch, $\alpha$, the angle of repose of the pellets at the top, and $\theta$, the included angle of the conical base of the stripping column, are shown.

The angle of repose, $\alpha$, is determined primarily by the geometry of the plastic pellets (wafer, spheroid, dogbone, etc.) fed; $\alpha$ is also dependent upon the velocity with which the pellets are fed and dropped onto the surface of the column of pellets and on the surface condition--wet vs. dry.

SUMMARY OF THE INVENTION

1. Process

There has been discovered a novel continuous process for the removal of volatiles (e.g., residual solvent from polymerization process or solvent carrier used for additives) from polymer pellets, or pelletized catalyst beds and the like, which has the advantages over previously known procedures of minimized back-mixing of pellets, elimination of air pollution, substantial savings in energy requirements with resultant economy in operation and reduction in investment required for equipment. This novel process provides maximum volatiles removal rates from the solid pellets even in the presence of high volatiles concentration in the stripping gas exiting the process and relatively low stripping gas flow rates. The process further permits controlled and equal residence times for substantially all of the solid pellets and provides that the contact time required to obtain a very low volatiles concentration in the pellets is minimized. Thus, a new high level of stripping efficiency is attained while volatiles recovery is greatly facilitated and contamination or comingling of different lots or grades of pellets is avoided. The process is readily adaptable to provide any desired throughput level while yielding pellets substantially completely freed of volatiles.

In accordance with the novel process of this invention, polymer pellets having surfaces wet with a film of water (which may be produced from condensation of steam onto their surfaces at the top of column or by pre-wetting or both) are continuously fed into the top of a vertical, downwardly-flowing bed of pellets moving in plug-flow and having an inverted conical base and drawn off at the bottom through the apex of the cone while steam is fed into the column near the base of the bed and flows upwardly, in a countercurrent direction to the flow of the wet pellets, picking up the vapor of residual solvent by stripping from the film of water surrounding each pellet; the steam containing the stripped volatiles at a concentration up to 25 – 30 mole % is then passed out of the top of the column to a conventional condensing and separating system from which the solvent stripped from the polymer pellets is recovered. The pellets from which the residual volatiles have been stripped are continuously drawn off from the apex of the inverted conical bottom of the downwardly flowing bed of pellets at the same rate as new pellets are added at the top. In the preferred case, the pellets are added at the top in an aqueous slurry while the excess water used to convey them is drawn off above the top of the column of pellets. In the most preferred case, back-mixing of pellets at the base of the column is minimized by feeding the pellets to the top of the column in a free-flowing, vertical, cylindrical stream which forms a circular pile having toroidal contour at the top of the column of pellets while, near the base of the cylindrical portion of the column of pellets where the column begins to narrow in a conical pattern to the bottom apex where the pellets are drawn off, the downwardly-flowing bed of pellets is deflected from the central axis of the column toward the outer circumference of the inverted conical base at a rate such that backmixing is minimized and approaches zero.

2. Apparatus

The novel apparatus of this invention is particularly suitable for use in carrying out the preferred process of the invention. It is shown in FIG. I.

FIG. I is a schematic drawing of a cylindrical stripping column of this invention containing a downwardly-moving bed of polymer pellets. Referring to FIG. I, the stripping vessel has a top cylindrical column section 1 having a volume sufficient to provide the residence time needed to complete volatiles stripping at the desired throughput and having a cross-sectional area large enough to permit countercurrent flow of stripping gas and wetted pellets without flooding with resultant agitation and back-mixing of the pellet bed; the bottom of the column is an inverted cone section, 2. Typically the cylindrical section has a length-to-diameter ratio greater than about 2:1 (e.g. usually between about 3 and 7 to 1, depending on residence time needed to complete solvent stripping at desired throughput; the only limitation on total height is the cost of very tall columns) with an inverted conical bottom section 2, preferably having an included angle between 20° and 60°, to ensure plug-flow in cylindrical top section, 1. Near the top of the vessel there is a conical inlet pellet feed distributor 3 positioned directly under the pellet inlet 10. The top of the conical feed distributor contains means (3a) for allowing liquid (water) to pass through; preferably it is constructed of a heavy mesh screen to permit water, entering through inlet 20 and carrying pellets entering through inlet 21 through S-seal 19, to pass inside of deflector 3 and out through outlet 12. The water level 22 in the S-seal prevents escape of steam. Inside the conical bottom of the stripping column a second pellet distributor 4 consisting of two cones joined at their bases is centered over pellet exit 11; the upper apex is also on the center line and at the knuckle line between the cylindrical column 1 and the conical bottom section 2. This distributor forms an annular passage 9 between its surfaces and the interior conical surface of the bottom section 2. Around the top cone of distributor 4 means 5 are provided to permit the stripping gas (steam) entering through pipe 8, to pass from the interior of distributor 4 into the descending bed of pellets 13. Preferably these means consist of a strong, supported well-screen with flush, smooth exterior surface around the circumference of the top cone of distributor 4. A screen 4a at the bottom apex of 4 permits any water condensed inside 4 to flow out. Means 6 are also provided to pass stripping gas entering through inlet 7 into the outer circumference of the descending bed of pellets 13. For instance, means 6 may consist of a hollow belt or a multiple outlet manifold around the outside near enough to the top circumference of bottom conical section 2 wo prevent flooding, and multiple, circumferentially regularly-spaced windows, constructed of strong well-screen, cut through and flush with the interior of the wall near and around the top circumference of the inverted conical bottom section 2. The top of stripper column 1 also contains a vapor exit 18 through which the stripping gas containing vapor of solvent stripped from polymer pellets is passed to a conventional condensing and separating train (not shown) to recover the organic solvent stripped from the polymer pellets. The top of the bed of polymer pellets 13 inside the stripper 1 has a toroidal contour, 14, with low points as a ring around the circumference and a low point at the axis of the stripping column and high points as a ring under the outer circumference of inlet feed distributor 3, which has a base diameter approximately one-half of the diameter of the column.

In the operation of the process of this invention in the apparatus of FIG. I, the pellets flow downwardly in plug flow (without mixing) so that individual pellets retain their original toroidal cnfiguration 14 until they reach position 15 at the bottom of the cylindrical portion of stripping column 1. As the pellets flow downwardly from position 15 into annular passage 9, their configuration is progressively levelled out, as shown by 16 and 17, by the flow pattern resulting from the construction of the bottom section 2 and the shape and position of bottom distributor 4 which minimizes and compensates for the back-mixing normally inherent to a reducing section.

In the operation of the process of this invention using the apparatus of FIG. I, the pellets, having surfaces wetted by the water carrying them through S-seal 19 and condensation from the upwardly-flowing steam, pass downwardly by gravity flow countercurrently to upwardly-flowing stripping gas comprising steam, optionally diluted with an inert gas, such as $N_2$, when temperatures below 100°C. are desired. The stripping gas enters the apparatus and contacts the downwardly-flowing pellets through gas distribution means 5 and 6 fed through inlets 7 and 8. The pellets, stripped of retained solvent, are drawn off continuously through outlet 11 at the same rate as pellets are fed to the top of the column while the stripping gas carrying the vapors of the organic solvent removed from the pellets is passed out through outlet 18 to conventional condensation and separator means whereby the solvent is recovered in liquid form. After leaving the stripper 1 through outlet 11 the pellets are passed to any conventional drying means. The temperature of the pellets in the stripping column is maintained at less than the sticking temperature of the particular solids utilized, i.e., by diluting the steam with an inert gas, such as $N_2$ or operating under reduced pressure, where the sticking temperature of the pellets is below 100°C.

Thus, the process of this invention provides a new continuous process for the removal and recovery of residual volatiles from polymer pellets that facilitates the recovery of the residual volatiles and avoids atmospheric pollution while contributing a substantial savings in energy requirements and operating costs. Stripping medium flow, vessel size, and solids back-mixing are minimized by countercurrent flow of stripping medium, e.g. steam, upward through a continuously downwardly moving bed of wetted pellets in a vertical, straight-sided stripping column with a cross-sectional area sufficient to allow upward flow of vapor without flooding or disturbing the downward plug flow of pellets and with a bottom reducing section of such geometry (included angle of 20° to 60°) and material of construction as will ensure plug-flow of the particulate solids in the top section and minimize back-mixing that could otherwise occur in the reducing section. The stripping medium enters said stripping column through inlets at its lower end sized and arranged to avoid disturbing the downward plug flow of pellets, and exits through a vapor outlet at its upper end, said stripping column having an inlet for addition of pellets at its upper end and a solids outlet at its lower end. The process comprises continuously adding cool (<100°C.) and/or wetted pellets to said stripping column, to maintain a level above said stripping medium inlets of a bed of wetted pellets, subjecting the bed of wetted pellets to countercurrent flow of stripping medium as the pellets descend in a plug-flow manner, said plug-flow movement continuing through the upper straight-sided vertical section of the column and substantially continuing through said bottom reducing section while said flow of stripping medium moves upwardly through the bed of wetted particles until reaching a vapor space above the bed level. The stripping medium, containing therewith volatiles removed from the pellets in the column, is carried off by way of a vapor outlet to a means for separating and recovering the residual volatiles from said stripping medium. The pellets, having a weight percent volatile content reduced to a sufficiently low value to permit subsequent handling, are collected from the bottom reducing section. The temperature of the pellets throughout the process is maintained at less than the sticking temperature of the particular pellets being stripped by control of the steam partial pressure. Means are provided to continuously withdraw pellets from said solids outlet at the bottom of the reducing section.

In the process of this invention, volatiles are stripped efficiently from polymer pellets in any convenient form, such as produced by melt extrusion and cutting of the extrudate, in the apparatus of the invention, a moving bed stripper which operates with minimal back-mixing, and the volatiles are recovered to avoid air pollution. Additionally, the process of the invention permits the use of substantially smaller stripping vessels and smaller volatile recovery equipment because of the improved efficiency of stripping.

DETAILED DESCRIPTION OF THE INVENTION

Figure 1:
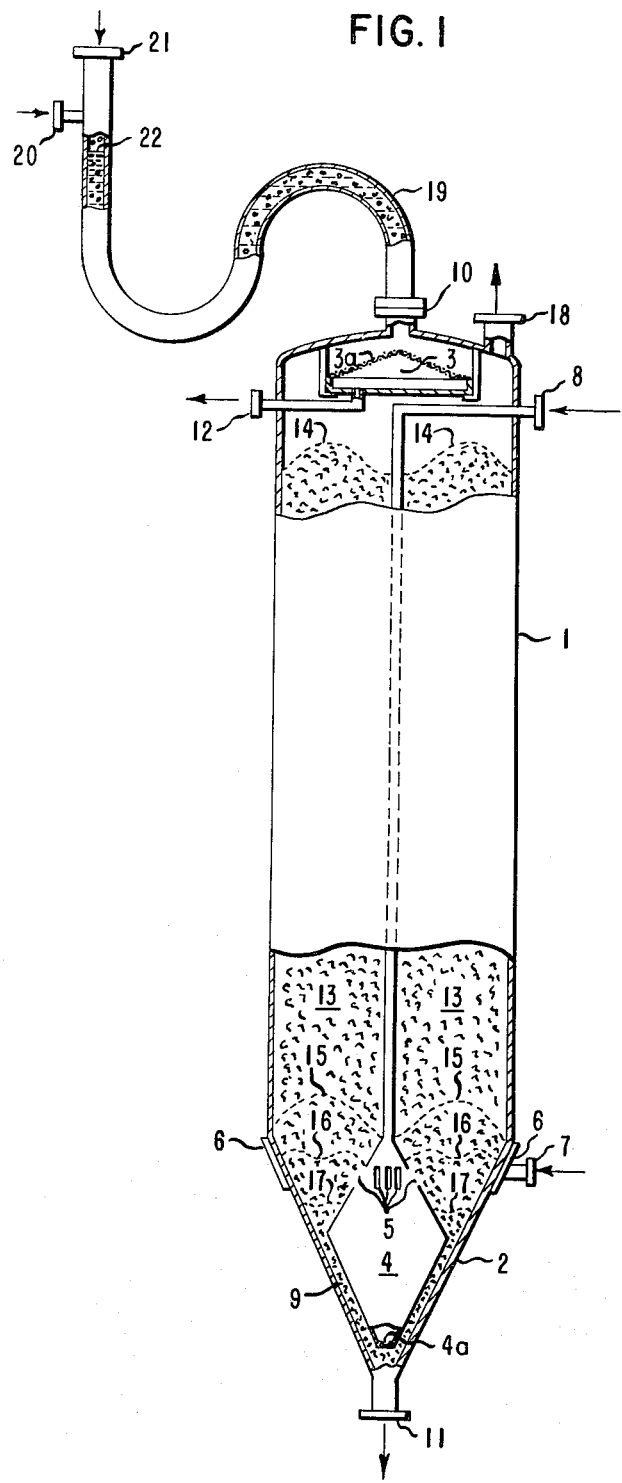

It is well known that removal of volatiles from particulate solids, particles or polymer pellets involves diffusion of the volatiles through the solid and then through a vapor film which tends to surround each particle. Maximum diffusion rates in the solid and maximum stripping rates are generally obtained at the maximum temperature at which the solid can be handled without fusion or degradation. Maximum stripping rates also require that the film barriers be minimized by high stripping media rates. In general, as the volatiles concentration in the film increases, the driving force for diffusion of the volatiles in the pellet decreases. In a "dry" system such as commonly practiced in the prior art, the pellet is surrounded by a gas film containing some concentration of volatiles. High stripping medium flows are required to maintain the volatiles concentration at low levels approaching zero. Surprisingly, we have found that the equilibrium conditions are favorably shifted when the pellets are wetted, e.g., by condensing steam and/or by immersion in water prior to entering the stripper, thereby forming a water film around each pellet. In the process of this invention, such a water film is formed about each pellet. The volatile concentration in this water film is extremely low due not only to the low solubility of the volatiles in water but also to the relatively high volatility of the volatiles/water azeotrope formed. Therefore, the effect of any vapor-film barrier is minimized and maximum stripping rates are still obtained using low stripping media (steam) flows.

In order to verify the shift in equilibrium that occured by changing from a dry system (water free) to a wet system, equilibrium data was collected. For the "dry" case, nitrogen gas was bubbled through controlled temperature cyclohexane to saturate the nitrogen gas and said gas was then passed through a bed of dry pellets at a temperature of 95°. The saturated mole fraction of cyclohexane in the nitrogen gas was varied by controlling the cyclohexane temperature. Sufficient time was allowed for the pellets to come to equilibrium (3 hours). In the "wet" test, the saturated nitrogen gas was mixed with steam and injected at the base of a column of wetted pellets controlled at a temperature of 95°C. Comparisons of equilibrium data are shown in FIG. II. The wet system showed a dramatic shift in equilibrium conditions as compared to the dry system.

Additionally, the pellet equilibrium concentration for the wet system was very low and was independent of cyclohexane concentration in the stripping gas.

The stripping medium of this invention includes steam alone and steam together with inert gas. The preferred inert gas is nitrogen. The most preferred medium is steam, usually at or slightly above 100°C., depending on the nature and stick-temperature of the polymer being treated.

Steam is also an excellent heat transfer medium. The polymer pellets are heated very quickly to the desired temperature by making use of the latent heat of condensation. Thus, vessel size is minimized since maximum stripping rates at the desired temperature are achieved very rapidly on contact with the steam.

When an inert gas is used alone, heat transfer is generally poor and high gas flows are required. Inert gas can be used with steam to reduce the partial pressure and temperature; however, the higher the inert gas concentration, the more expensive are the facilities to handle them.

The present invention also lends itself to a simplified volatiles recovery system. Volatiles insoluble in water are easily separated out by conventional condensation and decantation equipment. The size of the equipment required in the separation is minimized due to low steam flows and relatively high, essentially constant volatiles concentrations.

The residual volatiles of this invention may include hexane, cyclohexane, benzene, toluene, vinyl acetate and in general all those volatiles normally present from their use in the polymer synthesis process whose solubility in the liquid film surrounding the particulate solid is sufficiently low and the volatility of the volatile or the volatile/water azeotrope is sufficiently high so as to maintain a low concentration of volatiles in the liquid film. This invention is especially directed to the residual volatiles of cyclohexane and/or hexane due to their presence in high density polyethylene.

The particulate solids of this invention include polymeric pellets in any size and shape customarily subject to the molding and extrusion industry as well as nonpolymeric particulate solids of similar dimensions. Representative examples of polymeric pellets include polyethylene resins such as high density polyethylene resins and low density polyethylene resins, ionomer resins and polypropylene. Representative examples of nonpolymeric particles include coarse particulate catalyst beds. The preferred particulate solids to which this invention may be applied involve polymeric pellets. Most preferred are crystalline polyolefins, particularly HDPE. The preparation of polyethylene pellets as molding or extrusion granules is well known in the art and described in numerous patents.

In the process of this inventon volatiles are removed from solid pellets as the pellets descend in plugflow in the vertical section of the stripping column.

When the pellets reach the bottom reducing section of the stripping column, there tends to be a departure from the plug-flow due to inclined sides. The degree of departure from plug-flow depends on the angle the inclined sides form with the vertical and on the flow characteristics of the particular particles. This departure, defined as coefficient of back-mixing, $\beta$, as described below, can be minimized or eliminated by use of the preferred process and apparatus of FIG. I.

The term "plug-flow" as used herein is defined as the flow of solid materials in which all particles are moving at the same velocity at any cross section in the bed, with all of the pellets exiting the bed having had substantially the same residence time in the bed and with no stagnant volumes present in the moving bed of pellets.

Plug-flow in the upper section of the stripping column is essential to this process. Departure from plug-flow increases vessel size because sufficient hold-up time must be provided to strip the fastest moving pellet; also even small departures from plug-flow can drastically increase back-mixing leading to excessive contamination of quality product by nonstandard or subsequent grades of product. For example, if the residence time ratio of the fastest to the slowest pellet were 10/1, and there was a linear residence time distribution from the center to the wall of the typical cylindrical vessel, the vessel volume would have to be increased by approximately 50 percent, as compared to a plug-flow vessel, to provide adequate stripping, and the back-mixing would increase to a level several times higher than in a system with plug-flow. Existing processes for the removal of residual volatiles from particulate solids do not provide for continuous operation with plug-flow; hence, the aforesaid residence time ratios of 10/1 are not uncommon.

Backmixing in a moving bed of particulate solids through the bottom reducing section of the stripping column of this invention can be minimized by the installation within the stripping column of:

1. a top internal feed distributor located near the top of the stripping column comprising, typically, a conical deflector plate at the top of the stripping column with a circular cross-sectional area having a diameter approximately one-half the diameter of the stripping column, said deflector plate serving to distribute the particulate solids onto the bed to form a toroidal top contour so as to compensate for any divergence from plug-flow in the bottom reducing section of the column and, 2. a bottom internal flow distributor comprising, typically, a configuration of two cones joined at their bases, each having an included angle approximately the same as that of the bottom reducing section of the column and centered in the column with its apex even with the knuckle line between the vertical cylindrical portion and the bottom reducing section. An annular passage for pellet flow is thus formed between the surfaces of the bottom internal flow distributor and the bottom reducing section that is approximately concentric with an annular ring of generally toroidal contour at the top of the bed of pellets due to the top internal distributor.

The apparatus of this invention is useful for conducting the process of the invention for removing residual volatiles from polymer pellets or other solids of similar size and shapes and comprises (1) a vertical top section having a vapor outlet at its upper end to which means for recovery of volatiles is connected, an inlet for addition of pellets at its upper end, and positioned within, but below the inlet for the pellets, an internal feed distributor in the configuration of an inverted cone located so that the entering pellets are intercepted by the feed distributor and then discharged as a falling ring from the feed distributor into the stripping column and (2) a reducing bottom section or lower portion joined to the vertical top section at the knuckle line having a configuration of a cone, with a stripping medium injection means near its upper circumference and a pellet outlet at its bottom, positioned within said bottom section a second pellet deflector having an internal configuration consisting of two sections joined at their bases each having the configuration of the reducing bottom section, the apex of the two joined sections being centered on the axis of the column at the knuckle line to form an annular passage between the inside surfaces of the bottom reducing section and the aforesaid two joined sections, the pellets leaving the stripping column by way of said annular section to a discharge outlet at the bottom of the bottom reducing section.

In order to study the flow of pellets, slab models were made having the configuration of a narrow, rectangular box joined to an inverted wedge-shaped (trapezoidal) reducing section. The term "wedge-shaped", as used herein, is defined as a configuration having a short rectangular base and two parallel substantially rectangular sides joining them and inclined with respect to each other to follow the sides of the trapezoids. The top of this wedge-shaped reducing section joins the narrow, rectangular box. Tables I and II summarize the dimensions and materials of construction of the slab models. A smooth transition piece was installed between the upper rectangular and lower reducing sections to ensure a smooth flow of particles past the knuckle line (the junction of the vertical column and the bottom reducing section). All surfaces were aluminum or clear plastic. One-eighth inch diameter pellets of high density polyethylene were charged into the slab models at the levels indicated and the pellet velocity was measured at the elevations shown in Table III. The velocities were determined by measuring the time it took pellets to move vertically 3 inches. Pellet velocities were determined at different distances from the center line at each elevation. For most included angles tested, dry and wet pellet tests were run. In the wet tests, water was sprayed onto the top of the bed until the entire bed was wet. There were no changes in relative values of velocity obtained in wet versus dry beds.

TABLE I

SLAB MODEL DATA

| Width Inches | Thickness Inches | Height Inches | Discharge Opening Inches | Included Angle of Wedge |
|---|---|---|---|---|
| 24½* | 3⅞ | 40 | 3⅞ × 2⅞ | 33° – 136° |
| 44¾** | 3⅞ | 198 | 3⅞× 4 | 20° – 60° |

*Referred to as 2 foot slab.
**Referred to as 4 foot slab.

TABLE II

| | MATERIALS OF CONSTRUCTION | | |
|---|---|---|---|
| Model | Front | Rear | Sides |
| 2' slab | Clear plastic | Clear plastic | Aluminum |
| 4' slab | Clear plastic | Aluminum | Aluminum |

Table III summarizes some typical experimental data taken on the so-called 2' and 4' slab. It was determined visually that the pellets moved in a plug-flow manner ($V_S/V_{CL} = 1$) until they reached the region of the knuckle line. Then a transition period started in which the pellets at the wall moved more slowly than the pellets in the center of the vessel. At some point below the knuckle line, the pellet velocity at the wall, $V_S$, reached a steady state condition relative to the pellet velocity at the center line, $V_{CL}$, that is, $V_S/V_{CL}$ is constant equal to $\beta$, defined as the coefficient of back-mixing. In order to calculate the amount of mixing that occurs in the bottom reducing section, a mathematical model was used.

TABLE III

PELLET VELOCITIES IN SLAB MODELS

| Model Used | Comments on Test | W Inches | H Inches | Rel. Vel. = $V_S/V_{CL}$ at Wall-L | Rel. Vel. = $V_S/V_{CL}$ at Wall-R | β |
|---|---|---|---|---|---|---|
| 2' slab | Dry Pellets | 14 | — | .93 | 1.02 | 0.96 |
|  |  | 21 | — | .96 | .93 |  |
| θ=33° |  |  | 6 | .96 | 1.0 | 0.97 |
|  |  |  | 18 | .97 | .96 |  |
| 2' slab | Wet Pellets | 14 | — | .93 | .99 | 0.94 |
|  |  | 21 | — | .92 | .90 |  |
| θ=33° |  | — | 6 | .95 | 1.03 | 0.99 |
|  |  | — | 18 | — | — |  |
| 4' slab | Wet Pellets | 8.5 | — | .97 | .9 | 0.90 |
|  | Bed Ht. is | 25 | — | .84 | .88 |  |
| θ=33° | 8' above KL | 38 | — | .91 | .91 |  |
|  |  | — | 24 | .99 | .99 | 0.99 |
| 4' slab | Dry Pellets | 9.75 | — | .72 | .81 | 0.73 |
|  |  | 14 | — | .60 | .78 |  |
|  |  | 25 | — | .74 | .75 |  |
| θ=43° |  | 38.5 | — | .71 | .75 |  |
|  |  | — | 37 | .91 | .95 | 0.93 |
| 4' slab | Wet Pellets | 9.75 | — | .65 | .72 | 0.74 |
|  |  | 14 | — | .75 | .86 |  |
| θ=43° |  | 25 | — | .67 | .66 |  |
|  |  | 38.5 | — | .75 | .83 |  |
|  |  | — | 37 | .95 | .95 | 0.95 |
| 4' slab | Dry pellets | 12 | — | .63 | .65 | 0.63 |
|  |  | 25 | — | .58 | .65 |  |
| θ=60° |  | 38 | — | .64 | .61 |  |
|  |  | — | 10 | 1.02 | 1.01 | 1.02 |
| 4' slab | Wet Pellets | 12 | — | .63 | .55 | 0.72 |
|  |  | 25 | — | .65 | .81 |  |
| θ=60° |  | 38 | — | .86 | .80 |  |
|  |  | — | 10 | 1.03 | .94 | 0.99 |

LEGEND: (For Table III)
W — Width of the wedge at the elevation therein where pellet velocities were measured.
H — Height in rectangular section above the knuckle line where pellet velocities were measured.
Rel. Vel. = $V_S/V_{CL}$ — The velocity of the pellets at the wall ($V_S$) relative to the velocity of the pellets at the center line ($V_{CL}$). At TABLE III-continued

PELLET VELOCITIES IN SLAB MODELS

| Model Used | Comments on Test | W Inches | H Inches | Rel. Vel. = $V_S/V_{CL}$ at: Wall-L | Wall-R | β |
|---|---|---|---|---|---|---|

β = Average $V_S/V_{CL}$ — each elevation $V_{CL}$ was taken as 1. Averages for all points below knuckle line for each experimental set of data. Plug-flow above knuckle line is shown by close approach of β to 1.0.

θ — Included angle formed by the two narrow inclined rectangular sides of trapezoidal wedge.

KL — Knuckle line.

Wall-L — Left Wall
Wall-R — Right Wall } Arbitrarily termed facing from front.

It will be noted that some scatter exists in these data shown in Table III. In general, however, unless othewise noted, plug-flow was always visually observed in the upper, rectangular, section of the bed even though data points listed showed $V_S/V_{CL}$ for this upper section ranging from approximately 0.91 — 1.03. Similar scatter is noted in measurements made in the bottom section. However, plotting all available data from a given set of experiments using slab models, did in fact show $V_S/V_{CL}$ in the bottom section to be a constant for a given geometry and set of conditions.

From a consideration of all the data obtained, it can be concluded that the ratio of the velocity at the wall to the velocity at the center line, $V_S/V_{CL}$, is constant except in the transitions into and out of the reducing section, for a given included angle, θ, and a given model.

The following expressions have been shown experimentally to relate the various equipment and flow parameters for ⅛ inch pellets of high density polyethylene. They may be used to approximate the amount of mixing (quantity of good product contaminated by off-specification product) or to determine equipment parameters for a given flow and tolerable mixing situation.

$$X = Q(t' - t) \quad (1)$$

For slab vessels:

$$t = \frac{D_o Y - \tan \phi \, Y^2}{D_o V_o} \quad (2)$$

$$t' = t/\beta \quad (3)$$

For cylindrical vessels:

$$t = \frac{D_o^2 Y - 2 D_o \tan \phi \, Y^2 + \frac{4}{3}(\tan \phi)^2 Y^3}{D_o^2 V_o} \quad (4)$$

$$t' = t/\beta^2 \quad (5)$$

Where:

X = pounds mixed or contaminated.

Q = pellet flow rate, lbs./min. t = time in minutes for pellet to move vertically a distance Y at the point in the reducing section where the vertical velocity is the greatest (e.g. in a cylindrical column with no internal distributors, this will occur at the center line of the vessel).

t' = time in minutes for pellets at the vessel or distributor surfaces to move vertically a distance Y.

β = $V_S/V_{CL}$, the coefficient of back-mixing.

$V_S$ = vertical component of velocity of pellets at wall surface.

$V_{CL}$ = vertical velocity of pellets at the center line of the discharge passage.

$D_o$ = Diameter or width of upper (rectangular or cylindrical) section above the knuckle line except when the bottom distributor is used. For this case $D_o$ = ½ the vessel diameter or width.

φ = θ/2 = One-half the included angle, θ.

Y = Total height of mixing section (below the knuckle line).

$V_o$ = Pellet velocity at knuckle line.

FIG. III is a plot of β versus included angle, θ, for slabs, determined experimentally for high density polyethylene. In this plot all available data (not just those shown in Table III) were plotted, and the best smooth curve drawn through them is shown in FIG. III. Similarly, plots may be determined for any given material and geometry, assuming β to be independent of the width or diameter of the vessel's upper, constant diameter section.

Using Equations 1–3 above, it can be calculated that 35 pounds of pellets are mixed when operating a slab with a $D_o$ = 44.75 inches, a thickness = 3.875 inches, θ = 25°, at pellet flow rate of 44 lbs/min. ($V_o$ = 1.0 ft/min.) as follows:

Substituting Y = $D_o/2$ tan θ in expression (2) above gives t = Y/2$V_o$. Since Y = D/2 tan θ, Y = 44.75/(2) (tan 12.5°) = 101 inches, = 8.4 ft. t = 8.4/(2) (1.0) = 4.2 minutes. From FIG. III, β = 0.84. Therefore, t' = 4.2/0.84 = 5.0.

Then from expression (1) above, X = 44 times (5.0 − 4.2) or X = 35 pounds.

Actual tests in a slab model under these conditions showed 38 to 40 pounds mixed.

The back-mixing occurring in the conical hopper of cylindrical vessels can be calculated using Equations 4 and 5, above.

In all calculations to this point it has been assumed that a flat top profile for the bed is obtained when feeding the hopper. In reality this type of profile is not easily obtained. A reduction in back-mixing can be realized by centrally feeding the pellets and allowing a mount to form dependent on the angle of repose of the pellets. The reduced back-mixing occurs because the pellets in the center of the bed, which move the fastest through the reducing section, have a longer path to traverse ih the vertical cylindrical section. As can be seen from FIG. IV-A, the optimum included angle is very dependent on the angle of repose of the pellets. Since the angle of repose of a wet bed of typical high density polyethylene pellets will vary from 30° to 50°, depending on pellet geometry and flow characteristics, it was difficult to choose an included angle, $\theta$, that would consistently give minimal back-mixing. Additionally, the gradient in bed heights in the top of vessel will tend to cause preferential flow of the stripping vapor to the outside of vessel leading to non-uniform pellet stripping and to inefficient use of vessel volume. Hence, a precise formula for calculating $\theta$ cannot be given.

In the preferred process of this invention, internal pellet flow distributors are used to minimize back-mixing, with a minimal dependence on angle of repose, and also to ensure more uniform stripping and more efficient use of vessel size. The distributors consist of (1) feed distributor at the top comprising, typically, a conical (for vessels with circular crosssectional area) deflector plate axially centered near top of cylindrical column and having a diameter approximately one-half that of the cylindrical column in order to distribute the particles as a vertically falling ring onto the bed surface so as to form a toroidal top contour and thus compensate for the nonplug-flow pattern in the bottom reducing section of the vessel caused by (2), a bottom internal flow distributor comprising two cones (for a conical reducing section) attached at their bases and each having an included angle, $\theta$, approximately the same as that of the bottom reducing section of the vessel and centered in the vessel with its top apex even with the knuckle line. An annular passage for pellet flow is maintained between the surfaces of the distributor and the bottom reducing section.

FIG. IV-A illustrates the back-mixing calculation for the case where central feeding of pellets to form a mound in which the top bed profile has various angles of repose. Contamination in such cases was calculated by use of equation 1:

$$\text{Contamination} = Q(\text{lbs/min}) \, (t'-t) \quad (1)$$

which is based on vessels with flat bed profiles. For flat profiles $t' = t/\beta^2$. When the bed profile is governed by the angle of repose, $\beta$, of the particulate solids then $t' = (t/\beta^2) - t''$ where $t''$ is the added time that is required for those pellets that will have the highest vertical velocity in the reducing section to reach the knuckle line as compared to pellets entering the vessel at the same time but flowing through the hopper adjacent to the wall. For a given angle of repose $\alpha$:

$$t = \frac{D_o \tan \alpha}{2 V_o}$$

For some values of $\alpha$, the $\Delta t$ in Equation 1 is negative. Using Equations 1, 4, 5 and 6, the mixing that occurs in a round hopper can be calculated for various values of $\alpha$.

The reduced back-mixing that was obtained using the preferred process of this inventon employing internal pellet distributors at top and bottom of the column is illustrated in FIG. IV-B. As can be seen for included angles, $\theta = 20°$ to $60°$, the angle of repose, $\alpha$, is not as critical and low levels of back-mixing are obtained regardless of the included cone angle, $\theta$, and angle of repose $\alpha$. Additionally, in the preferred process the stripping medium is injected through the bottom distributor to further enhance the flow distribution of the stripping vapor, thus ensuring uniform stripping.

It is generally recognized that the steeper the included cone angle, $\theta$, of a hopper, the more certain one can be that uniform solid flow can be obtained without dead spots or slow moving zones forming in the vessel. However, the height of the reducing section becomes increasingly larger as the included angle is reduced. Therefore, choice of included angle depends on an economic balance between back-mixing and equipment costs.

The following examples are illustrative only and are not intended to limit or delimit the invention as previously described. Many modifications which will not alter the substance of the process or apparatus disclosed will be apparent to one of ordinary skill in the art.

The polyethylene pellets employed in the following exemplifications of the process of this invention include pellets ranging in size roughly from 1/16 inch to 3/8 inch in cross-section dimensions in any of the usual commercial "cuts" — spheroidal, diamond, cube, cylinder, etc. The term "polyethylene" encompasses both homopolymers of ethylene and copolymers of ethylene with such comonomers as vinyl acetate or higher olefins (e.g. butene, octene, decene) and ranging in density from 0.91 to 0.97, approximately. The preferred polyethylene pellets are ⅛ inch meltcut "spheres" of high density polyethylene (HDPE). The preparation of polyethylene pellets by melt-extrusion and cutting is well known in the art and described in numerous patents.

EXAMPLE 1

In order to demonstrate maximum diffusion rates, residual volatile recovery, and the ability to obtain plugflow, a transparent polypropylene model stripping column 23 inches in diameter and 89 inches in overall height with a conical bottom having an included angle of 33° was charged with approximately 400 pounds of high density polyethylene pellets approximately ⅛ inch in diameter. Approximately 36 pounds per hour of approximately 2–3 psig saturated steam was injected into four 1½ inch nozzles located 29 inches above the discharge opening of the cone and 90° apart. The nozzles were flush with the vessel surface and had a screen overlay to prevent entry of pellets. A batch operation was run in which the pellets were continuously recycled at a rate of 600 pph by redirecting the pellets from the bottom back into the top. Plug-flow was achieved on each pass through the cylindrical portion of the column as determined by visual observation of a layer of black pellets. The overhead vapor was condensed and collected. Samples were taken from the bed one foot above the knuckle line periodically for two hours and analyzed for weight percent cyclohexane. The data obtained are shown below in Table IV, operating with:

400 lbs. HDPE pellets, density = 0.96
Pellet temperature = 100°C.
Pressure = 1 atm. (absolute).

TABLE IV

| Time of Sample (mins) | PELLET SOLVENT CONCENTRATION | | |
|---|---|---|---|
| | Cyclohexane Collected (mls.) | Wt.% Cyclohexane in the Pellets Lab. Analysis | Wt.% Cyclohexane in the Pellets Calculated |
| 0 | 0 | 1.11 | 1.35 |
| 10 | 600 | 0.92 | 1.09 |
| 20 | 1200 | 0.89 | 0.83 |
| 40 | 1750 | 0.55 | 0.60 |
| 70 | 2270 | 0.39 | 0.38 |
| 80 | 2360 | 0.34 | 0.34 |

TABLE IV-continued

PELLET SOLVENT CONCENTRATION

| Time of Sample (mins) | Cyclohexane Collected (mls.) | Wt.% Cyclohexane in the Pellets Lab. Analysis | Wt.% Cyclohexane in the Pellets Calculated |
|---|---|---|---|
| 90 | 2490 | 0.25 | 0.28 |
| 100 | 2550 | 0.29 | 0.26 |
| 130 | 2880 | 0.13 | 0.15 |

EXAMPLE 2

In order to verify maximum diffusion rates and plug-flow in a full scale vessel a 13½ foot diameter vertical cylindrical vessel having a frustoconical bottom having an upper diameter $D_1$ of 13½ feet and a lower diameter $D_2$ of 5 feet and an included angle of 40° and having in connection with said frustoconical bottom at $D_2$, a conical section with an included angle of 90°, was loaded with approximately 125,000 pounds of high density polyethylene containing 1.5–1.75 percent by weight of cyclohexane. A black marker layer of approximately 25,000 pounds was loaded on top of said bed. Steam was injected into the vessel through three nozzles located in said bottom conical section. Continuous discharging of said bed from the vessel and loading of fresh unstripped pellets on top of said bed was started at typically 30,000 lbs/hr. The off-gas of steam and cyclohexane was vented out the top of said vessel. A pellet sample point was located in the discharge line. Periodic samples were taken and analyzed to determine stripping rates and pellet intermixing. The pellets leaving the vessel exited with 0.05–0.07 weight percent cyclohexane after 5 hours in the vessel. Plugflow was demonstrated as evidenced by the fact that predicted contamination using expressions (1), (4), and (5) above, which assume plug-flow above the knuckle line, agreed very closely with actual test contamination values. Stripping data and plug-flow data are shown in Tables V and VI.

Solvent half-life as used herein is the difference in time $(t-t_o)$ at which the concentration (C) of residual volatile components at time, "$t$" in the pellets is half the initial concentration $(C_o)$ of said components at some earlier time, $t_o$.

TABLE V

STEAM STRIPPING DATA
STRIPPING TEMP. 100°C.

| Resin Type | Effective Spherical Radius (E.S.R.) of HDPE Pellet. Centimeters | Cyclohexane Half-Life, min. Actual | Cyclohexane Half-Life, min. Calculated |
|---|---|---|---|
| HDPE | 0.202 (Measured) | 62–64* | 62.5** |

*Obtained from actual stripping data collected during test on 13.5 ft. diameter vessel.
**Calculated half-life using laboratory data.

TABLE VI

PLUG-FLOW DATA

| Source of Contamination | Quantity Contaminated (thousands of pounds) |
|---|---|
| A. Size of Color Shot | 25 |
| B. Mixing in Cone, Calculated | 31.2 |
| Total Calculated* | 56.2 |
| Actual Contamination ** | 56 |

*The calculated total assumes perfect conditions. The mixing due to the presence

TABLE VI-continued

PLUG-FLOW DATA

| Source of Contamination | Quantity Contaminated (thousands of pounds) |
|---|---| of downcomers in the vessel, rough spots at cone joints, and mixing due to steam injection is not included in the predicted value.
**Actual contamination might be slightly higher since sample technique did not permit true evaluation of the last pounds contaminated.

EXAMPLE 3

The following is an example of full scale operation of the process of this invention in the novel apparatus of this invention demonstrating maximum diffusion rates, solvent recovery rates, and plug-flow.

Figure 4B:
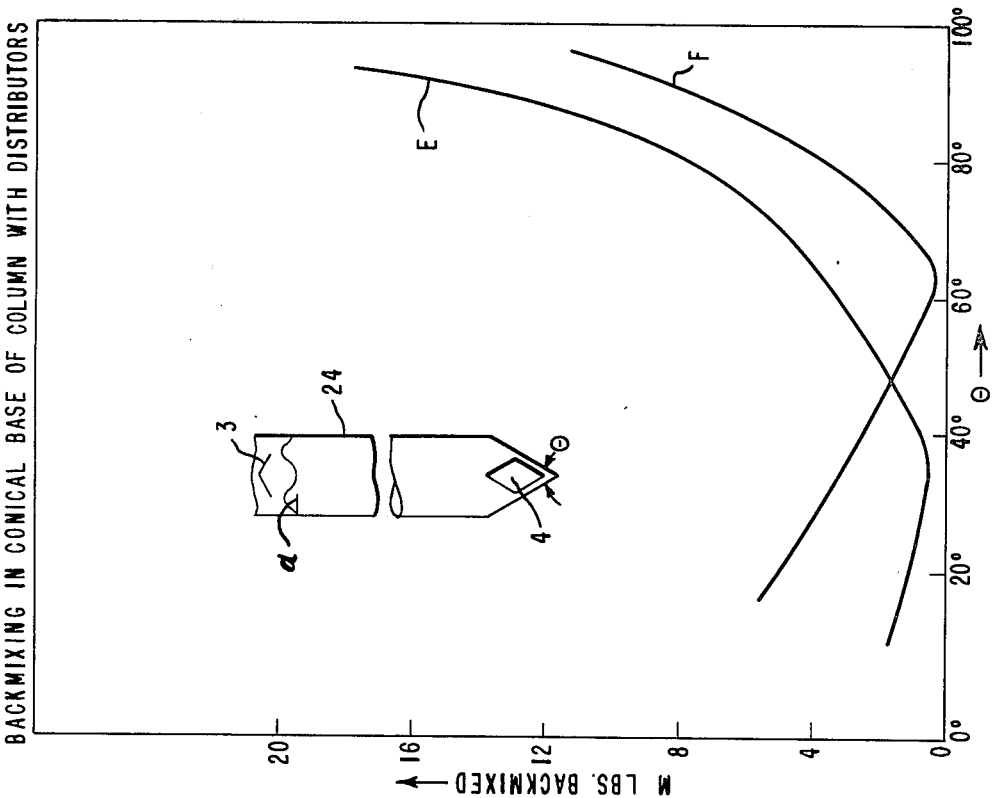
Figure 4A:
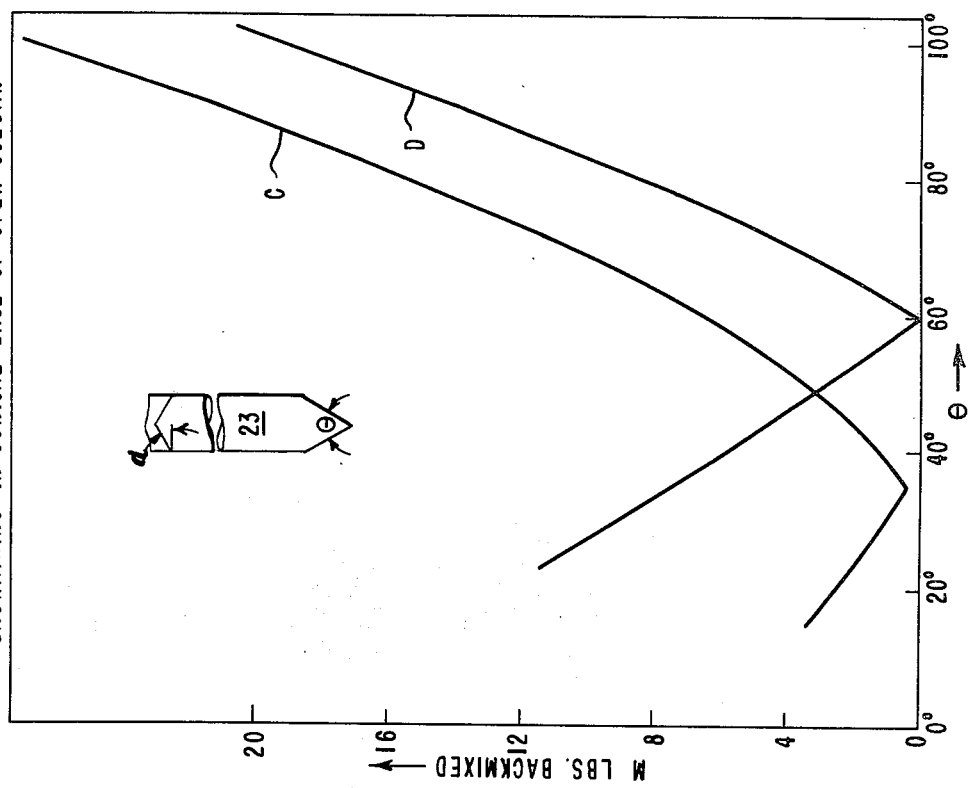

A stripping vessel is comprised of a cylindrical top section 12 feet in diameter and a bottom conical section having an included angle of approximately 33°. Internal top and bottom distributors (FIGS. 1, 3 and 4) are used to reduce back-mixing that occurs in the conical bottom section. The bottom distributor is comprised of two cones attached at their widest diameter which is approximately half the diameter of the cylindrical top section with each of the cones having an included angle of approximately 33°. The purpose of these cones is to reduce the volume of the conical bottom section of the stripping vessel where back-mixing occurs thereby minimizing back-mixing. The bottom distributor is positioned with the apex of the top cone located in the center of the stripping vessel at the same vertical elevation as the knuckle line. The apex of the bottom cone of the distributor is in the center of the vessel at a location just above the pellet discharge nozzle. The distributor is sized to provide an annular passage for pellet flow between the bottom distributor and the bottom conical section of the vessel. When pellets reach the knuckle line, those at the center of the annular passage (a distance of approximately 25 percent of the diameter of the cylindrical top section away from vessel wall) begin moving faster relative to the remainder of the pellets. The top distributor, comprising a cone with an included angle of 100° to 120° with a diameter of approximately 50 percent of the diameter of the cylindrical top section and a cylindrical ring positioned around the outer edge of conical distributor cone with an annular opening between the cone and the ring, is placed just under the centrally-located top feed nozzle in the top of that stripping vessel. Feed pellets fall onto the centrally-located top distributor, slide and/or bounce down the inclined distributor surface and fall onto the top of the pellet bed in said vessel causing a high spot circular ring concentric with the vessel with the said high spot being directly above the center of the annular discharge passage in bottom section of the vessel. This provides a slightly longer path to travel through the bed for those particulate solids which move the fastest in the bottom conical section. Thus, the back-mixing occurring in the bottom conical section is reduced.

The stripping vessel is charged with approximately 165,000 lbs. of high density polyethylene (HDPE) pellets containing approximately 2.5 weight percent residual cyclohexane; saturated steam at 4–5 psig is passed through the bed countercurrent to the pellet flow at approximately 5000 pph. Steam injection points located in said bottom conical section are designed and positioned so as to minimize upsets in pellet flow. The vessel is filled and continuously discharges pellets from the bottom of the conical section while feeding wet pellets into the top of the vessel to maintain a constant bed level. The feed rate is 36,000 pph and hold-up time in the vessel is 4.6 hours (approximately 275 min.). The maximum half-life of cyclohexane in HDPE pellets of approximately 0.17 cm., Effective Spherical Radius (E.S.R.), in a system that is completely solid state diffusion controlled, is 50 minutes. The process of this invention permits the residual cyclohexane level to be reduced to approximately 0.055 weight percent (550 ppm) upon discharge from the vessel. Residual volatiles must be less than 1000 ppm for material to be safe for packaging. Under the conditions of this example this reduction can be achieved with a pellet hold-up time between five and six times the maximum half-life of cyclohexane in the HDPE pellets. Approximately 875 pph of cyclohexane are recovered by passing the stripping gas from the top of the column to a conventional condenser and separator system. If an upset should occur in the reaction system causing off-quality resin to be fed into the stripper, this can be diverted down-stream of the discharge nozzle of the stripper with a minimum loss of quality resins. Loss of quality will be further minimized by the presence of the aforementioned distributors. The loss of quality resins because of mixing following such an upset is calculated as from zero to 5000 pounds.

If n-hexane is substituted for cyclohexane, similar results can be achieved with the same ratio of hold-up time to n-hexane half-life in the HDPE pellets. If pellets entering the stripping system contain more or less residual solvent (or if shipping requirements require more or less residual solvent in the pellets) then this ratio should be adjusted accordingly to provide a final volatiles content of the desired level. Thus, for n-hexane, usually a lower value is required such as less than about 400 ppm.

The novel mass-transfer and stripping system (process and apparatus) of this invention as described hereinabove provides a number of unexpected advantages which make it most useful and beneficial in plastics manufacturing processes. This novel system provides a way to strip and recover residual volatiles from plastics pellets without the environmental pollution which has been a concomitant negative feature of prior processes. Furthermore, this novel system provides a way to remove these volatiles from pellets with lower energy consumption that in the prior art processes, such as dry-steam-stripping in accord with Canadian Patent 836,977. The dry-stripping process of that patent requires that all the steam be carried through as vapor in air. Such a system also fails to realize the novel mass transfer provided by the process and apparatus of this invention. Thus the prior art had considered that it would be impossible to achieve plug-flow of pellets in vessels of large dimensions whereas the novel apparatus of our invention makes this goal achievable in commercial scale equipment.

The substantial savings in energy requirements and reduction in air pollution achieved by the novel process of this invention can be calculated and compared with the best prior art. The results are shown in Table VII:

TABLE VII

| Polymer Stripping System | Efficiency | | Solvent Recovery | Air Pollution | |
|---|---|---|---|---|---|
| | | | | Hydrocarbon | Thermal |
| | Energy KWH/M lbs Prod. | Vol M pph/ft$^3$ vessel | lbs solvent/ M lbs Prod. | M lbs solvent released to atmosphere/ M lb Prod. | KWH/M lbs Product |
| Batch air stripping | 70–75 | $1.6 \times 10^{-3}$ | 0 | 25 | 60–65 |
| Batch dry steam stripping (Can. Pat 836,977) | 70–75 | $2.5 \times 10^{-3}$ | 0 | 25 | 35–40 |
| Continuous Moving Bed Wet Steam Stripping (according to this invention) | 35–40 | $7.4 \times 10^{-3}$ | 25 | 0 | 15 |

The values for energy efficiency shown in Table VII were calculated using the sum of the heat-up requirements, heat-loss requirements and energy required to strip the volatiles in each case. The energy required for the batch air process was calculated as the electrical energy required to drive the blowers, which compress and heat the air and force the air through the column of pellets plus the heat losses inherent in systems of this type. The energy required for the dry steam process was calculated as the electrical energy required to run the air blowers plus the BTU's in the steam vented. The energy required for the wet-stripping moving bed process of this invention was calculated as simply BTU's required to generate the steam used.

The volume efficiency calculations shown in Table VII for the batch air-stripper process and the batch dry steam-stripping process were calculated as the total number of pounds (in thousands) of pellets charged divided by the time required for one complete stripping cycle (filling, stripping, and discharge), all divided by the volume of the vessel. In the case of the continuous wet moving bed steam-stripping process of this invention, the volume efficiency was calculated by the rate (in thousands of pounds) per hour divided by the vessel volume which provides an average hold-up time of five hours.

It is apparent from the data of Table VII that the novel process of this invention provides substantial savings both in energy and recovery of solvent, eliminates air pollution by hydrocarbons and minimizes thermal pollution, as compared with the processes of the prior art. Such advantages, and even the possibility of achieving them, are not suggested by any of the teachings of the prior art.

We claim:

1. An apparatus suitable for removing residual volatiles from solid pellets which consists essentially of the combination of:

a. a vertical cylindrical top section having a length-to-diameter ratio greater than about 3:1 above, b. an inverted conical bottom reducing section,
c. a first conical pellet distributor axially centered with its apex just below and adjacent to a pellet inlet at the center of the top of the column, the circular horizontal base of said distributor having a diameter of about one-half the diameter of the cylindrical column,
d. a second pellet distributor located within the conical bottom reducing section, said second pellet distributor having the form of two cones joined at their bases, said cones haing included angles approximately equal to the included angle of the conical reducing section at the bottom of the column and said second distributor being axially centered with its upper apex at the level of the knuckle joining the cylindrical top portion and the conical bottom reducing section of the column leaving an annular passage between the distributor the wall of the conical reducing section, said second pellet distributor containing circumferentially distributed means in its top portion for passing gas from the interior to the exterior,
e. gas inlet means leading to the interior of the second pellet distributor,
f. gas inlet means circumferentially evenly spaced near and around the top of the inverted conical reducing section of the column,
g. a pellet outlet at the base apex of the inverted conical reducing section of the column said first conical pellet distributor (c) is hollow and affords means in its conical surface to permit liquid to flow through from the exterior to the interior of the hollow distributor, and means leading from the interior of said first distributor to a liquid outlet outside the column and in which the pellet inlet at the center of the top of the column is connected to a liquid S- seal having a mixing tee at its further end with an inlet for liquid and an inlet for solid pellets, and
h. a gas outlet in the top of the column.

2. The apparatus of claim 1 in which the included angle of the bottom inverted conical reducing section is between 20° and 60°.

* * * * *

UNITED STATES PATENT OFFICE
CERTIFICATE OF CORRECTION

PATENT NO. : 3,958,585
DATED : May 25, 1976
INVENTOR(S) : Robert Garnett Humkey and
Donald James Ryan It is certified that error appears in the above-identified patent and that said Letters Patent are hereby corrected as shown below:

Column 19, line 11, "haing" should be --having--.

Column 19, line 18, --and-- should be inserted between "distributor" and "the".

Signed and Sealed this

Third Day of August 1976

[SEAL]

Attest:

RUTH C. MASON
Attesting Officer

C. MARSHALL DANN
Commissioner of Patents and Trademarks